United States Patent
Moe (10) Patent No.: US 8,137,567 B1
(45) Date of Patent: *Mar. 20, 2012

(54) METHOD FOR FLUID REMEDIATION AND REMOVING PARTICULATES FROM AN AQUEOUS STREAM

(75) Inventor: Edward Beverly Moe, Willis, TX (US)

(73) Assignee: Tri-Flo International, Inc., Willis, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,909

(22) Filed: Nov. 19, 2010

Related U.S. Application Data (60) Provisional application No. 61/285,709, filed on Dec. 11, 2009.

(51) Int. Cl.
| | |
|---|---|
| C02F 1/38 | (2006.01) |
| C02F 1/52 | (2006.01) |
| B01D 21/01 | (2006.01) |
| B01D 21/02 | (2006.01) |
| B01D 21/26 | (2006.01) |

(52) U.S. Cl. ........ 210/725; 210/728; 210/729; 210/749; 210/788; 210/806; 175/206

(58) Field of Classification Search .................. 210/702, 210/723, 724, 725, 729, 749, 788, 790, 806, 210/202, 207, 208, 219, 241, 242.1, 252, 210/257.1, 259, 728; 175/66, 206
See application file for complete search history.

(56) References Cited

U.S. PATENT DOCUMENTS

| | | | | |
|---|---|---|---|---|
| 4,459,207 A * | 7/1984 | Young | ........................... | 175/206 |
| 4,526,687 A * | 7/1985 | Nugent | ......................... | 210/202 |
| 4,931,190 A * | 6/1990 | Laros | ............................ | 210/783 |
| 5,236,605 A * | 8/1993 | Warncke | ....................... | 210/800 |
| 5,626,748 A * | 5/1997 | Rose | ............................. | 210/241 |
| 5,853,583 A * | 12/1998 | Shah | ............................. | 175/206 |
| 6,110,382 A * | 8/2000 | Wiemers et al. | ................ | 175/66 |
| 7,727,389 B1 * | 6/2010 | Mallonee et al. | ............. | 210/241 |
| 7,731,840 B1 * | 6/2010 | Mallonee et al. | ............. | 210/241 |

* cited by examiner

*Primary Examiner* — Nam Nguyen
*Assistant Examiner* — Lucas Stelling
(74) *Attorney, Agent, or Firm* — Buskop Law Group, PC; Wendy Buskop (57) ABSTRACT

A method for fluid remediation and removing particulates from an aqueous stream is described herein. The method can use a separation component and a clarifier component. A slurry can flow to a scalping shaker which can separate the slurry, forming a first effluent. The first effluent can flow from the scalping shaker to a first section and can be agitated. The first effluent can be pumped to a mud cleaner and cleaned, forming a second effluent. The second effluent can flow into a second section and can be agitated. The second effluent can be pumped to a desilter and can be desilted, forming a third effluent. The third effluent can flow to a third section. The third effluent can be pumped to a second tank of the clarifier component. The third effluent can be decelerated within the second tank, forming a clean effluent.

19 Claims, 7 Drawing Sheets

METHOD FOR FLUID REMEDIATION AND REMOVING PARTICULATES FROM AN AQUEOUS STREAM

CROSS REFERENCE TO RELATED APPLICATIONS

The present application claims priority and the benefit of U.S. Provisional Application Ser. No. 61/285,709 filed on Dec. 11, 2009, entitled "METHOD FOR FLUID REMEDIATION AND REMOVING PARTICULATES FROM AN AQUEOUS STREAM". This reference is incorporated herein in its entirety.

FIELD

The present embodiments generally relate to a method for fluid remediation and removing particulates from an aqueous stream.

BACKGROUND

A need exists for a method that can use a fluid remediation system for removing particulates from an aqueous stream.

A further need exists for a method that can use a fluid remediation system that is portable, containerizable, and explosion resistant.

The present embodiments meet these and other needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for fluid remediation and removing particulates from an aqueous stream. Embodiments of the method can use a fluid remediation system that can be portable, containerized, explosion resistant, or combinations thereof.

The method can be used to recycle a used primary slurry to improve rheology of a drilling fluid. Primary slurry can be a water based drilling fluid, such as a drilling fluid used for drilling an oil well.

Particulate that can be removed from the primary slurry can be drill cuttings, low gravity solids, or other particulates. For example, a first particulate that can be removed from the primary slurry can have a diameter of at least seventy microns.

The method can include providing a separation component. Embodiments of the separation component usable in the method can be portable, containerized, explosion resistant, or combinations thereof.

The separation component can be disposed on a trailer which is also referred to herein as "a first frame". The first frame can be a moveable first frame.

The first frame can include at least one first axel for supporting a first wheel and a second wheel, allowing for ease of movement of the separation system.

The first frame can have at least one fixed walkway or a support grating, a stairway, a handrail, illuminating lights, or combinations thereof disposed on or along a side of the first frame.

In embodiments, the illuminating lights can be 400 watt lights, telescoping lights, or combinations thereof.

The separation component can include a first scalping shaker disposed on the first frame. The method can use the first scalping shaker for separating the first particulate from the primary slurry, forming a first effluent. Examples of scalping shakers that can be used with the method include: a Triflo 148L Linear Shaker, a Triflo 148E, a Triflo 146E Elliptical Shaker, or a Triflo 126E; all of which are available from Tri-Flo International, Inc. of Willis, Tex.

The method can include the step of discharging the first particulate from the first scalping shaker to a particulate moving means. The method can include the step of using the particulate moving means to transfer the particulate from the separation component. The particulate moving means can be a screw conveyor.

The method can include using a particulate moving means trough, which can be disposed around the screw conveyor to prevent particulate from falling on the ground. The method can include using the particulate moving means trough to catch overflowing effluent from any on-board tank or sections of tanks.

The separation component can have a first tank disposed on the first frame. The first tank can have a first section that can be in fluid communication with a second section of the first tank. The second section can be in fluid communication with a third section of the first tank. The first section, second section, and third section can each have an agitator for agitating any contents of the sections.

The method can include providing fluid communication between the first section and the first scalping shaker.

The method can include flowing the first effluent from the first scalping shaker to the first section.

The method can include agitating the first effluent using a first agitator disposed in the first section, thereby keeping solids of the first effluent in suspension. Examples of agitators that can be used with the method include: a Triflo 500 Mud Agitator, a Triflo 750 Mud Agitator, or a Triflo 1000 Mud Agitator; all of which are available from Tri-Flo International, Inc. of Willis, Tex.

The mud cleaner can be provided on the separation component. The mud cleaner can be in fluid communication with the first section. A step can include flowing or pumping the first effluent to the mud cleaner from the first section. The method an include using the mud cleaner to remove mud or a second particulate from the first effluent, thereby forming a second effluent. A first pump can be used to pump the first effluent from the first section to the mud cleaner. Examples of mud cleaners that can be used with the method include: a Triflo 16-4/146E, a Triflo 8-4/126E, or a Triflo 12-4/146E; all of which are available from Tri-Flo International, Inc. of Willis, Tex.

Fluid communication can be provided between the mud cleaner and the second section. The method can include discharging the second particulate to the particulate moving means. The method can include flowing the second effluent from the mud cleaner into the second section. The method can include agitating the second effluent using a second agitator disposed in the second section, thereby keeping solids of the second effluent in suspension.

A desilter can be provided on the separation component. The desilter can be in fluid communication with the second section. Examples of desilters that can be used with the method include: a Triflo 30-2/146E or a Triflo 20-2/126E; which are available from Tri-Flo International, Inc. of Willis, Tex.

The method can include flowing the second effluent from the second section to the desilter. A second pump can be used to pump the second effluent from the second section to the desilter. The desilter can be used to remove a third particulate from the second effluent, which can form a third effluent.

The third section can be in fluid communication with the desilter. The method can include flowing the third effluent from the desilter to the third section.

The method can include agitating the third effluent using a third agitator disposed in the third section, thereby keeping solids of the third effluent in suspension.

The method can include discharging the third particulate from the desilter to the particulate moving means. In an embodiment, the desilter can be an ultrafine desilter.

A third pump can be used for pumping the third effluent to a discharge outlet. The discharge outlet can be in fluid communication with the third section.

In an embodiment, the first pump, the second pump, and the third pump can each be centrifugal pump or vertical direct pump.

The pumps, the first scalping shaker, the mud cleaner, the desilter, the agitators, and the particulate moving means can all be engaged with a controller. The controller can be in communication with the first scalping shaker, the mud cleaner, the desilter, the agitators, or the particulate moving means.

The method can include providing power and control signals to the pumps, the first scalping shaker, the mud cleaner, the desilter, the agitators, and the particulate moving means by the controller.

Embodiments can include moving the separation component with the first frame along a roadway without the need for special permits to transport the separation component to a work site, such as a drilling location.

The method can include fully containing the separation component within an eight foot and six inches wide standard sized system that can be legally used on roadways. In embodiments, the standard sized system can be a smaller standard sized system.

In embodiments, a support grating can be provided on the separation component over at least one of the first section, the second section, or the third section.

Embodiments can include providing at least one clean out port disposed in at least one of the first section, the second section, and the third section. Each clean out port can provide access to each section and can be used to clean each section.

An embodiment can include providing a holding tank on the first frame. The holding tank can be in fluid communication with the first tank. The method can include flowing overflow effluent from the first tank into the holding tank.

A vertical mixer disposed in the holding tank can be used to keep solids of the overflow effluent in suspension or agitated.

A vertical pump can be disposed in the holding tank to pump contents of the holding tank from the holding tank to the first section of the first tank.

The method can include using a clarifier component. The clarifier component can be portable, explosion resistant, containerized, or combinations thereof.

The clarifier component can include a second frame, which can be a moveable second frame.

A second tank can be disposed on the second frame. The second tank can be a cone shaped tank.

In embodiments, the first tank can be in fluid communication with the second tank. For example, the discharge outlet can be in fluid communication with the second tank.

The method can include flowing the third effluent from the discharge outlet of the separation component to the second tank.

The method can include decelerating the third effluent in the second tank, thereby forming a sludge and a clean effluent. The method can include discharging the clean effluent from the second tank through an effluent discharge outlet, also herein referred to as a clarifier discharge outlet. The effluent discharge outlet can be in fluid communication with the second tank. The sludge can be discharged through a sludge discharge outlet.

The clean effluent can be recycled back into an active drilling fluid or can be disposed of, such as in an injection well.

At least one axel with two wheels can be provided on the second frame, which can allow for ease of movement of the clarifier component. A ladder can be provided on the second frame.

A clean out port can be disposed in the second tank. The method can include shutting down the clarifier component, opening the clean out port, and cleaning the second tank.

In embodiments, the clarifier component can include a static mixer disposed on the second frame. The method can include shutting down the clarifier component and using the static mixer to introduce a polymer from a polymer injector into the second tank. The static mixer can be used to facilitate blending of the polymer with any remaining third effluent within the second tank, thereby forming a clean aqueous stream and a sludge. As such, the second tank can be cleaned.

The clean aqueous stream can be discharged through the effluent discharge outlet, and the sludge can be discharged from the second tank through a clean out port.

In embodiments, the polymer can be a polyacrylamide. In embodiments, a polymer make down injector system can be secured to the second frame.

The polymer make down injector system can be used to blend the polymer with other components for introduction to the static mixer. The polymer make down injector system can include an injection pump for pressure feeding the polymer into a polymer tank.

Embodiments can include a second injector in fluid communication with the second tank. The second injector can be used with the clarifier component to introduce bentonite, barite, or a pH modifier to the third effluent.

Embodiments of the clarifier component can have a capacity of about 6000 gallons.

One or more hydraulic lifts can be provided on the first frame, the second frame, or combinations thereof. The method can include leveling of the frames using the one or more hydraulic lifts.

An attachment, such as a hitch, can be provided on the frames. The method can include using the attachment to attach the frames to a tow vehicle for movement of the frames along a roadway.

Figure 1:
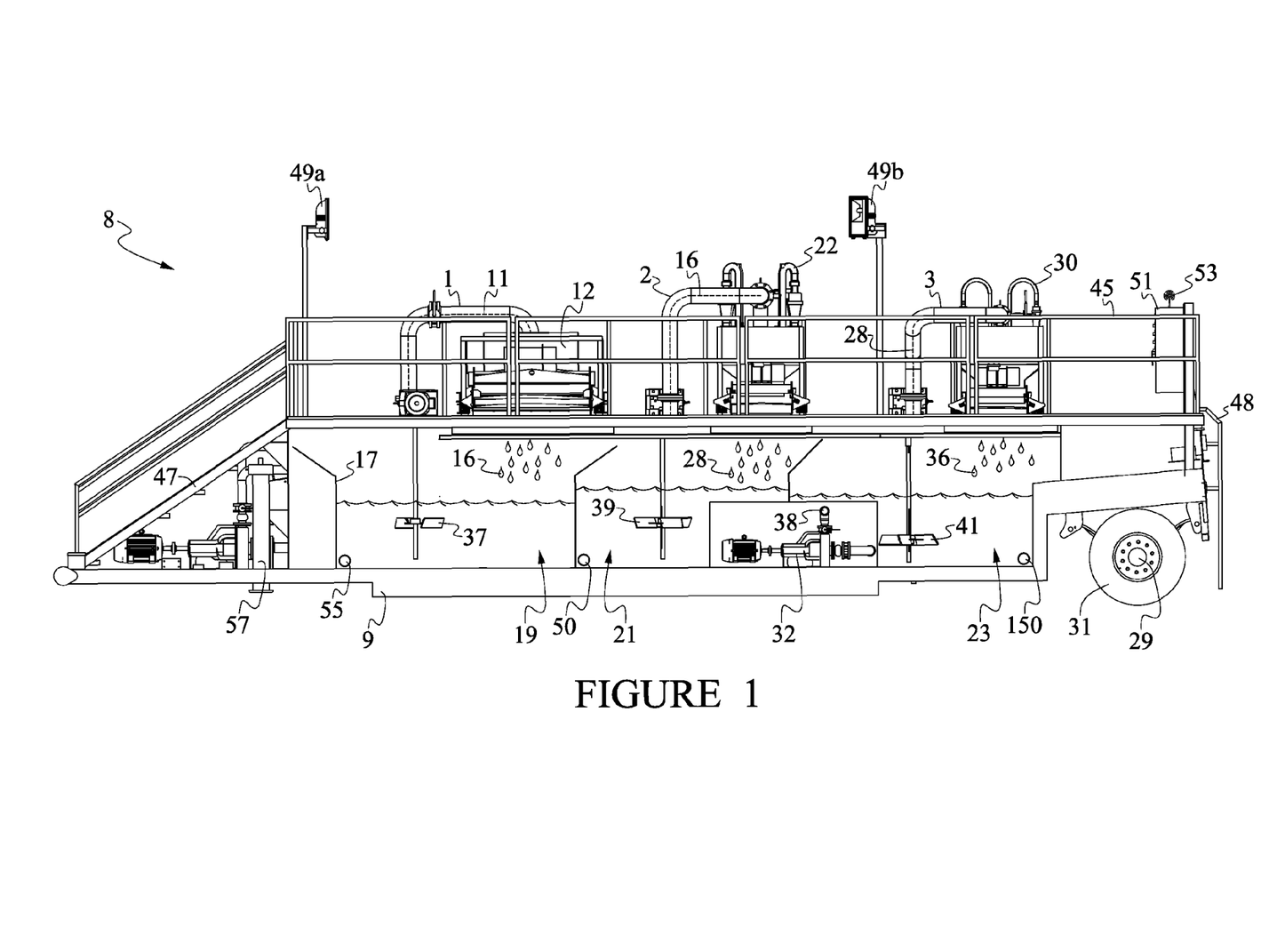
FIG. 1 is a top view of a separation component usable in the method.

Turning now to the Figures, FIG. 1 shows the separation component 8 having a moveable first frame 9.

On the moveable first frame 9 is a first scalping shaker 12 for separating a first particulate from the primary slurry 11. The primary slurry 11 can flow through a pipe or another flow line to the first scalping shaker 12. The primary slurry 11 is shown flowing to the first scalping shaker 12 through a first conduit 1.

A first tank 17 can be in fluid communication with the first scalping shaker 12. A first section 19 of the first tank 17 is shown receiving the first effluent 16 from the first scalping shaker 12.

The first effluent 16 is shown being pumped from the first section 19 through a second conduit 2 to a mud cleaner 22.

A second effluent 28 is shown flowing into a second section 21 of the first tank 17.

The second effluent 28 is also shown being pumped from the second section 21 to a desilter 30 through a third conduit 3.

A third effluent 36 is shown flowing from the desilter 30 to a third section 23 of the first tank 17.

A controller 51 can send power and control signals 53 to at least one of: a third pump 32, additional pumps that are not shown in this Figure, the desilter 30, the mud cleaner 22, a first agitator 37, a second agitator 39, a third agitator 41, the first scalping shaker 12, a particulate moving means which is not shown in this Figure, and other components of the separation component 8.

The third pump 32, the scalping shaker 12, the mud cleaner 22, the desilter 30, the agitators 37, 39, or 41, and the particulate moving means can each engage or otherwise be in communication with the controller 51.

The third pump 32 can pump the third effluent 36 from the third section 23 to a discharge outlet 38.

A first section clean out port 55 can be in fluid communication with the first section 19. A second section clean out port 50 can be in fluid communication with the second section 21. A third section clean out port 150 can be in fluid communication with the third section 23. Each respective clean out port can provide access to the first, second, and third sections of the first tank 17, allowing a user to clean or otherwise maintain the first tank 17.

The first section 19 can have the first agitator 37. The second section 21 can have the second agitator 39. The third section 23 can have the third agitator 41.

The separation component 8 can have illuminating lights 49a and 49b, a stairway 47, a hydraulic lift system 57, a first axel 29, a first wheel 31, a handrail 45, and a ladder 48.

Figure 2:
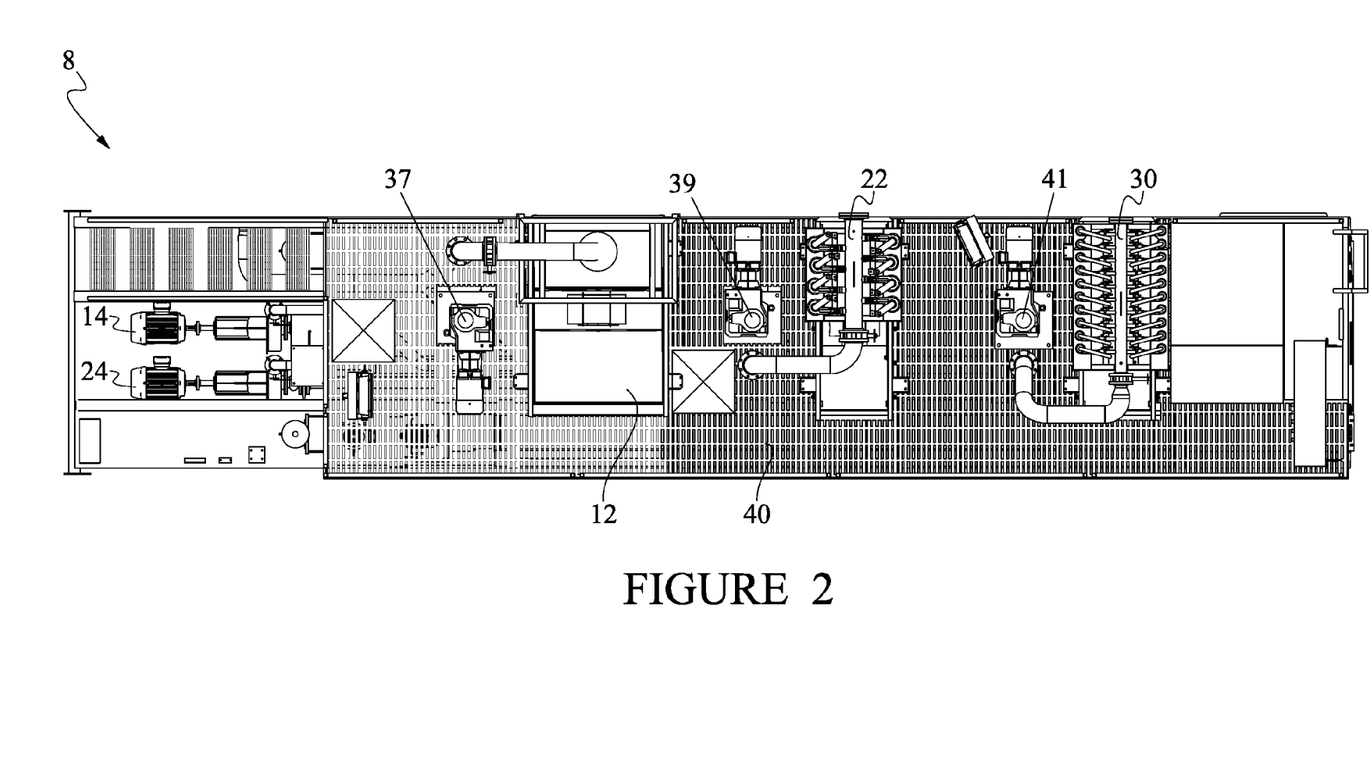
FIG. 2 is a side view of the separation component usable in the method.

FIG. 2 is a top view of the separation component 8. The separation component 8 is shown with the desilter 30, the mud cleaner 22, the first scalping shaker 12, the first agitator 37, the second agitator 39, and the third agitator 41.

A first pump 14 is shown for pumping the first effluent from the first section to the mud cleaner 22. A second pump 24 is shown for pumping the second effluent from the second section to the desilter 30. Also shown is a support grating 40.

Figure 3:
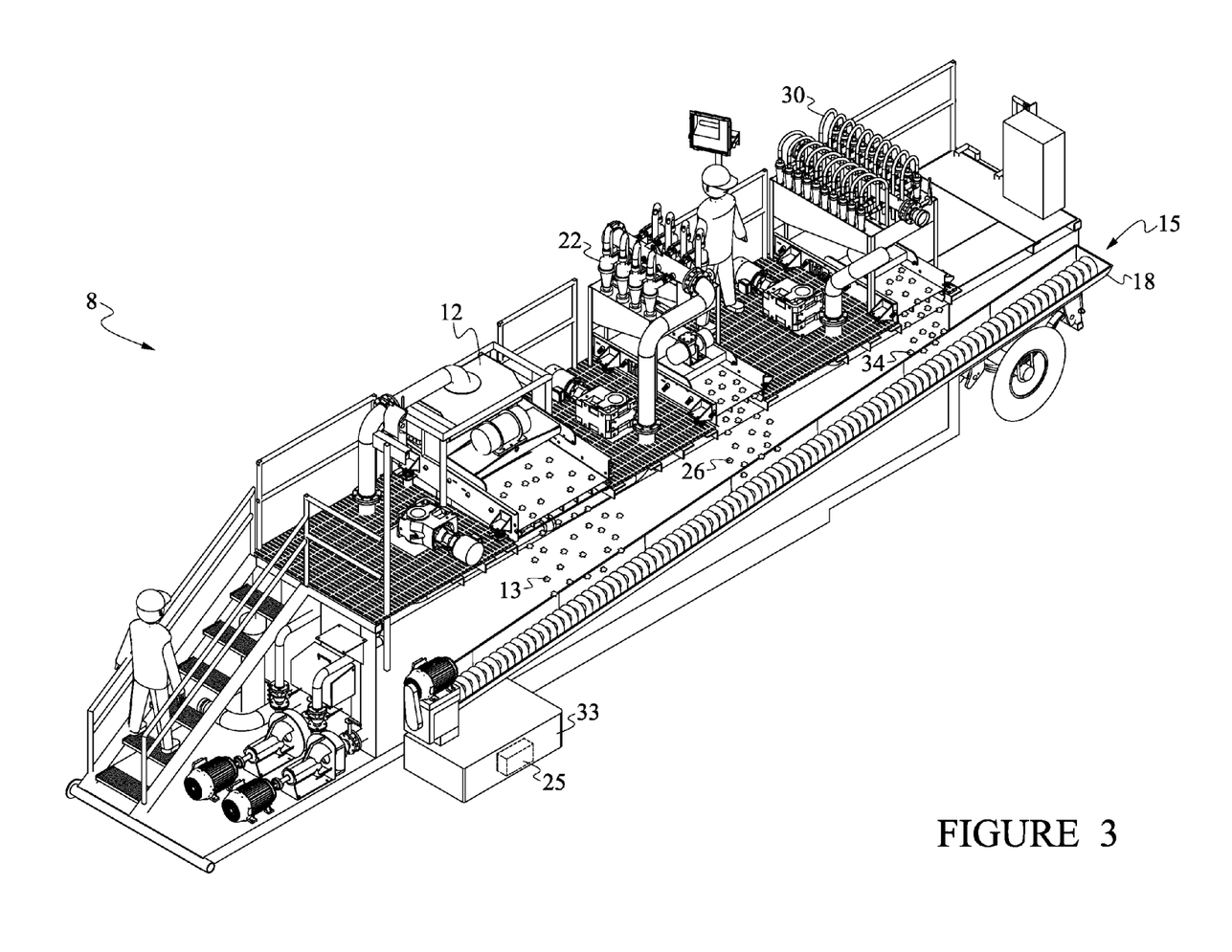
FIG. 3 is an isometric view of the separation component usable in the method.

FIG. 3 is a perspective view of the separation component 8.

A particulate moving means 15 with a particulate moving means trough 18 can receive effluent when effluent overflows from at least one of the sections of the first tank 17. The particulate moving means 15 can be an auger, as depicted, or a similar device.

The first particulate 13 is shown being discharged from the first scalping shaker 12 into the particulate moving means trough 18 of the particulate moving means 15.

The second particulate 26 is shown being discharged from the mud cleaner 22 into the particulate moving means trough 18.

The third particulate 34 is shown being discharged from the desilter 30 into the particulate moving means trough 18.

Also shown is the holding tank 33 for receiving the overflow effluent and the a vertical pump 25.

Figure 4:
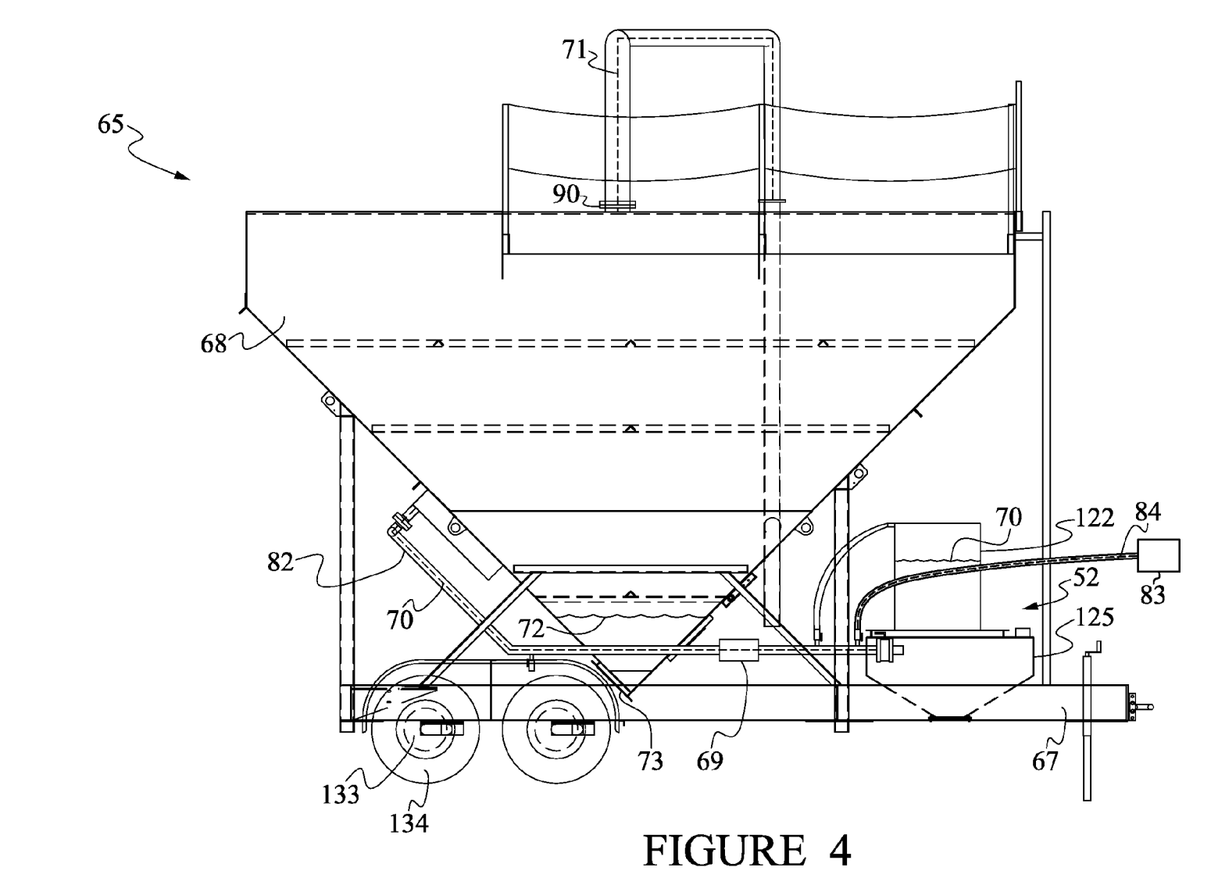
FIG. 4 is a side view of a clarifier component usable in the method.

FIG. 4 is a side view of a clarifier component 65. The clarifier component 65 can be in fluid communication with the separation component.

The clarifier component 65 can include a moveable second frame 67, a clarifier axel 133, and a clarifier wheel 134.

A second tank 68 can be disposed on the moveable second frame 67, which can receive the third effluent from the discharge outlet of the separation component.

The clarifier component 65 is also shown having a polymer make down injector system 52 for injecting a polymer 70 into the second tank 68. An injection pump 125 and a polymer injector 82 can be used to flow the polymer 70 from a polymer tank 122 to the second tank 68. The polymer make down injector system 52 can blend the polymer 70 with other components for introduction to a static mixer 69, and then into the second tank 68.

The static mixer 69 can facilitate blending of the third effluent with the polymer 70, forming a clean aqueous stream 71 and a sludge 72. The sludge 72 can be discharged from a clean out port 73 and can be subsequently dried. The clean aqueous stream 71 is shown flowing from an effluent discharge outlet 90.

A second injector 83 is shown in fluid communication with the second tank 68 for introducing a second component 84 into the second tank 68. The second component 84 can be bentonite, barite, or a pH modifier, and can be mixed with the polymer 70, such as with the static mixer 69.

Figure 5:
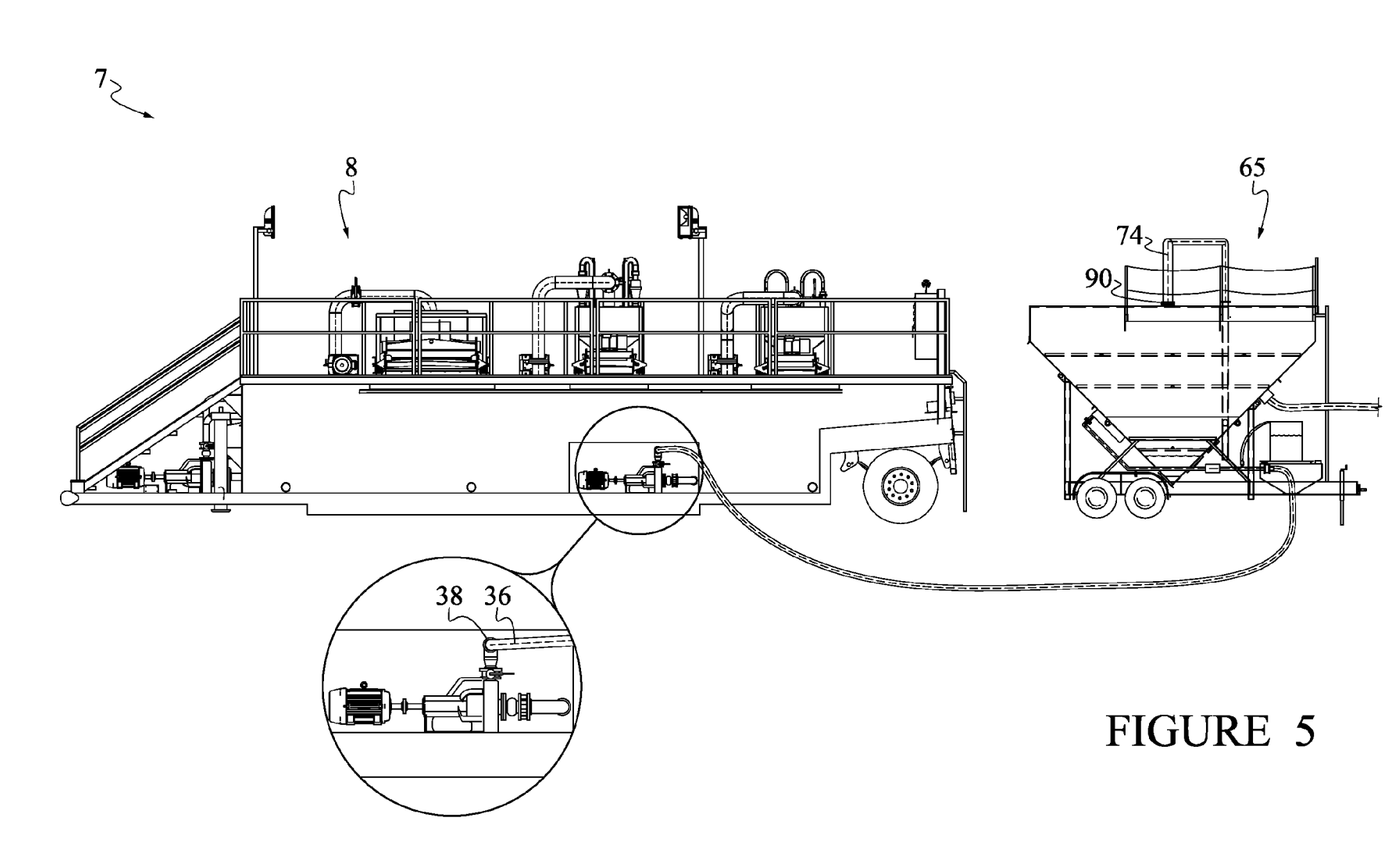
FIG. 5 is a view of the separation component and the clarifier component usable in the method.

FIG. 5 shows an embodiment of the fluid remediation system 7. The clarifier component 65 is shown in fluid communication with the discharge outlet 38 of the separation component 8, and is shown receiving the third effluent 36 from the discharge outlet 38. A clean effluent 74 is show flowing from the clarifier component 65 through the effluent discharge outlet 90.

Figure 6A:
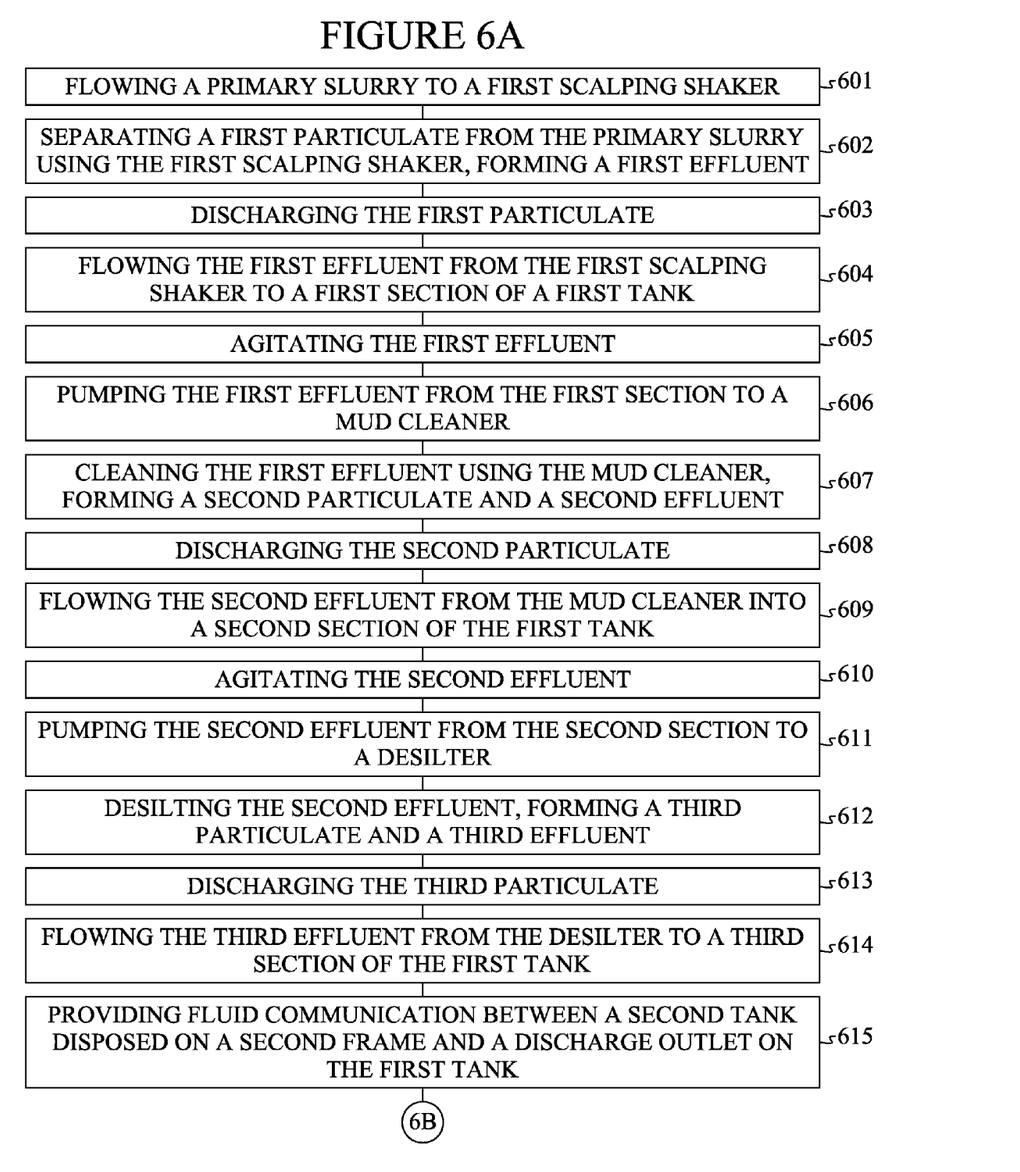
FIGS. 6A-6B depict a diagram of an embodiment of the method.

FIG. 6A shows a diagram of an embodiment of the method that can be implemented using the system described herein.

Step 601 can include flowing a primary slurry to a first scalping shaker.

Step 602 can include separating a first particulate from the primary slurry using the first scalping shaker, forming a first effluent.

Step 603 can include discharging the first particulate

Step 604 can include flowing the first effluent from the first scalping shaker to a first section of a first tank.

Step 605 can include agitating the first effluent.

Step 606 can include pumping the first effluent from the first section to a mud cleaner.

Step 607 can include cleaning the first effluent using the mud cleaner, forming a second particulate and a second effluent.

Step 608 can include discharging the second particulate.

Step 609 can include flowing the second effluent from the mud cleaner into a second section of the first tank.

Step 610 can include agitating the second effluent.

Step 611 can include pumping the second effluent from the second section to a desilter.

Step 612 can include desilting the second effluent, forming a third particulate and a third effluent.

Step 613 can include discharging the third particulate.

Step 614 can include flowing the third effluent from the desilter to a third section of the first tank.

Step 615 can include providing fluid communication between a second tank disposed on a second frame and a discharge outlet on the first tank.

Figure 6B:
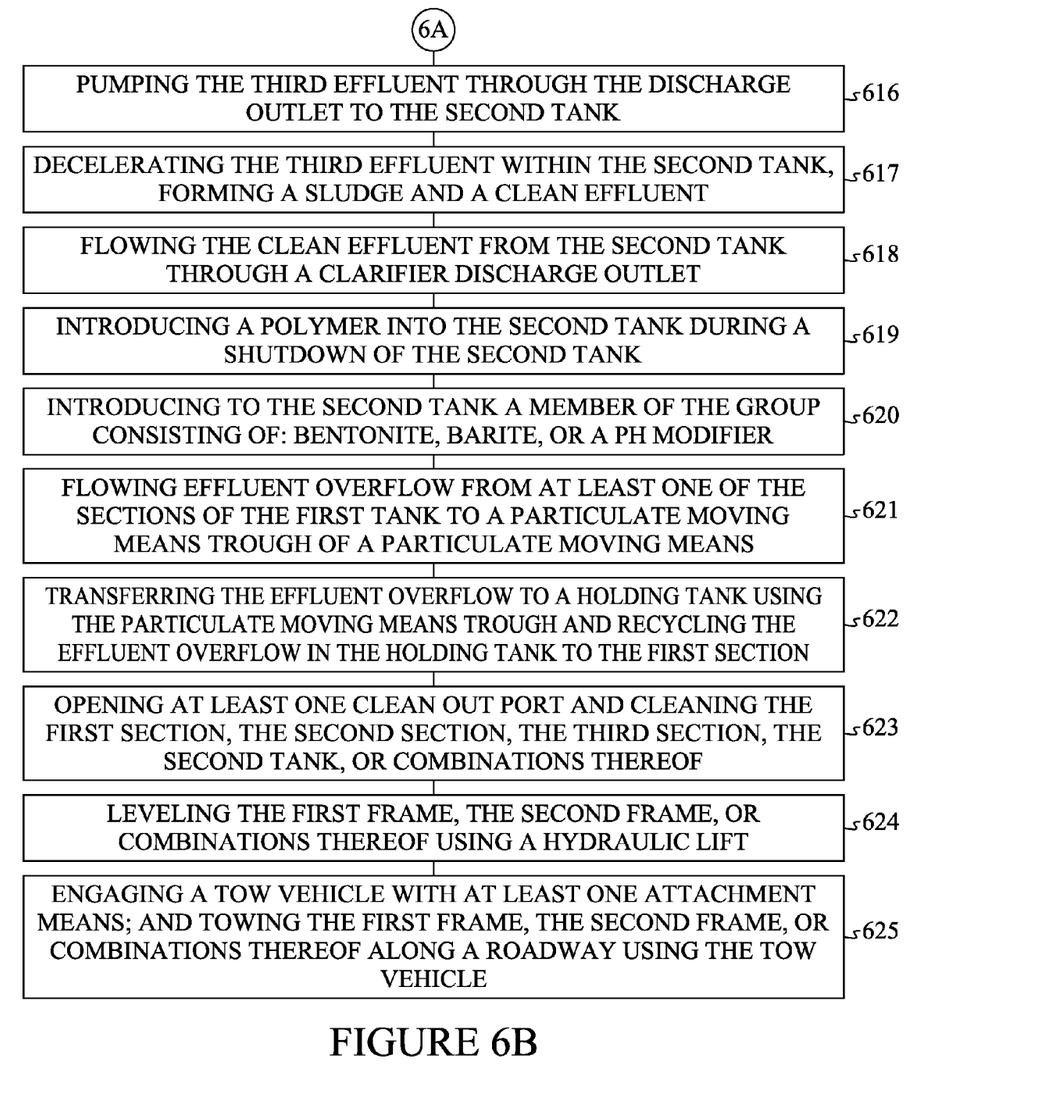

FIG. 6B shows a continuation of the diagram of FIG. 6A.

Step 616 can include pumping the third effluent through the discharge outlet to the second tank.

Step 617 can include decelerating the third effluent within the second tank, forming a sludge and a clean effluent.

Step 618 can include flowing the clean effluent from the second tank through a clarifier discharge outlet.

Step 619 can include introducing a polymer into the second tank during a shutdown of the second tank.

Step 620 can include introducing to the second tank a member of the group consisting of: bentonite, barite, or a pH modifier.

Step 621 can include flowing effluent overflow from at least one of the sections of the first tank to a particulate moving means trough of a particulate moving means.

Step 622 can include transferring the effluent overflow to a holding tank using the particulate moving means trough and recycling the effluent overflow in the holding tank to the first section.

Step 623 can include opening at least one clean out port and cleaning the first section, the second section, the third section, the second tank, or combinations thereof.

Step 624 can include leveling the first frame, the second frame, or combinations thereof using a hydraulic lift.

Step 625 can include engaging a tow vehicle with at least one attachment means; and towing the first frame, the second frame, or combinations thereof along a roadway using the tow vehicle.

While these embodiments have been described with emphasis on the embodiments, it should be understood that within the scope of the appended claims, the embodiments might be practiced other than as specifically described herein.

What is claimed is:

1. A method for fluid remediation and removing particulates from an aqueous stream, wherein the method comprises:
   (a) using a separation component with a first frame to:
      (i) flow a primary slurry to a first scalping shaker;
      (ii) form a first effluent by separating a first particulate from the primary slurry using the first scalping shaker;
      (iii) discharge the first particulate from the first scalping shaker to a particulate moving means disposed on the first frame;
      (iv) flow the first effluent from the first scalping shaker to a first section of a first tank on the first frame;
      (v) agitate the first effluent using a first agitator disposed in the first section;
      (vi) pump the first effluent from the first section to a mud cleaner using a first pump;
      (vii) clean the first effluent using the mud cleaner to form a second particulate and a second effluent;
      (viii) discharge the second particulate to the particulate moving means;
      (ix) flow the second effluent from the mud cleaner into a second section of the first tank;
      (x) agitate the second effluent using a second agitator disposed in the second section;
      (xi) pump the second effluent from the second section to a desilter disposed on the first frame using a second pump;
      (xii) desilt the second effluent using the desilter to form a third particulate and a third effluent;
      (xiii) discharge the third particulate to the particulate moving means;
      (xiv) flow the third effluent from the desilter to a third section of the first tank; and
      (xv) provide a discharge outlet on the third section, wherein the discharge outlet is in fluid communication with the third section;
   (b) using a clarifier component with a second frame to:
      (i) provide fluid communication between a second tank disposed on the second frame and the discharge outlet;
      (ii) pump the third effluent through the discharge outlet to the second tank using a third pump disposed on the first frame;
      (iii) form a sludge and a clean effluent by decelerating the third effluent within the second tank; and
   (c) flowing effluent overflow from at least one of the sections of the first tank to a particulate moving means trough of the particulate moving means.

2. The method of claim 1, further comprising flowing the clean effluent from the second tank through an effluent discharge outlet.

3. The method of claim 1, further comprising:
   (a) providing communication between a controller and at least one of: the first pump, the second pump, the third pump, the first scalping shaker, the mud cleaner, the desilter, the first agitator, the second agitator, the third agitator, and the particulate moving means; and
   (b) providing power and control signals to at least one of: the first pump, the second pump, the third pump, the first scalping shaker, the mud cleaner, the desilter, the first agitator, the second agitator, third agitator, and the particulate moving means using the controller.

4. The method of claim 1, further comprising introducing a polymer into the third effluent.

5. The method of claim 4, further comprising using a polymer make down injector system to introduce the polymer into the second tank, wherein the polymer make down injector system comprises:
   (a) a polymer tank containing the polymer;
   (b) a polymer injector in fluid communication with the second tank and the polymer tank, wherein the polymer injector introduces the polymer into the second tank;
   (c) an injection pump in fluid communication with the polymer tank, wherein the injection pump pressure feeds the polymer into the second tank; and
   (d) a static mixer in fluid communication with the injection pump, wherein the static mixer blends the polymer with other components before introducing the polymer to the second tank, and wherein a clean aqueous stream and a sludge are formed as the polymer is introduced into the second tank.

6. The method of claim 1, further comprising introducing to the second tank bentonite, barite, or a pH modifier.

7. The method of claim 1, further comprising:
   (a) transferring the effluent overflow to a holding tank using the particulate moving means trough; and
   (b) recycling the effluent overflow in the holding tank to the first section.

8. The method of claim 7, further comprising pumping the effluent overflow from the holding tank to the first section using a vertical pump disposed in the holding tank.

9. The method of claim 1, further comprising supporting a first wheel and a second wheel with a first axel disposed on the first frame.

10. The method of claim 1, further comprising supporting a first clarifier wheel and a second clarifier wheel with a clarifier axel disposed on the second frame.

11. The method of claim 1, further comprising providing a handrail, a stairway, an illuminating light, a ladder, or combinations thereof on the first frame.

12. The method of claim 1, further comprising:
    (a) opening at least one clean out port to access the first section, the second section, the third section, the second tank, or combinations thereof; and
    (b) cleaning the first section, the second section, the third section, the second tank, or combinations thereof.

13. The method of claim 1, further comprising leveling the first frame, the second frame, or combinations thereof using a hydraulic lift.

14. The method of claim 1, further comprising:
    (a) providing at least one attachment means on the first frame, the second frame, or combinations thereof;
    (b) engaging a tow vehicle with the at least one attachment means; and
    (c) towing the first frame, the second frame, or combinations thereof along a roadway, using the tow vehicle.

15. The method of claim 1, wherein the primary slurry is a drilling fluid.

16. The method of claim 15, wherein the first particulate, the second particulate, and the third particulate are each a member of the group consisting of: drill cuttings, low gravity solids, and other particulates.

17. A method for fluid remediation and removing particulates from an aqueous stream, the method comprising using a separation component to:
    (a) flow a primary slurry to a first scalping shaker;
    (b) form a first effluent by separating a first particulate from the primary slurry;
    (c) flow the first effluent from the first scalper shaker to a first section of a first tank;
    (d) agitate the first effluent within the first section;
    (e) flow the first effluent from the first section to a mud cleaner;
    (f) form a second effluent and a second particulate by cleaning the first effluent using the mud cleaner;
    (g) flow the second effluent into a second section of the first tank;
    (h) agitate the second effluent within the second section;
    (i) flow the second effluent from the second section to a desilter;
    (j) form a third effluent by removing a third particulate from the second effluent using the desilter;
    (k) flow the third effluent from the desilter into a third section of the first tank;
    (l) discharge the third effluent from the third section to a discharge outlet; and
    (m) flowing effluent overflow from at least one of the sections of the first tank to a particulate moving means trough of a particulate moving means.

18. The method of claim 17, further comprising using a clarifier component to:
    (a) provide fluid communication between the discharge outlet and a second tank of the clarifier component;
    (b) flow the discharged third effluent from the discharge outlet into the second tank;
    (c) decelerate the third effluent within the second tank to form a sludge and a clean effluent; and
    (d) discharge the clean effluent through an effluent discharge outlet.

19. A method for fluid remediation and removing particulates from an aqueous stream using a separation component on a first movable frame and a clarifier component on a second movable frame, the method comprising:
    (a) separating a first particulate from a primary slurry to form a first effluent;
    (b) discharging the first particulate;
    (c) agitating the first effluent in a first section of a first tank;
    (d) cleaning mud from the first effluent to form a second particulate and a second effluent;
    (e) discharging the second particulate;
    (f) agitating the second effluent in a second section of the first tank;
    (g) desilting the second effluent to form a third particulate and a third effluent;
    (h) discharging the third particulate;
    (i) discharging the third effluent from a third section of the first tank to a discharge outlet;
    (j) discharging the third effluent from the discharge outlet into a second tank;
    (k) decelerating the third effluent within the second tank to form a sludge and a clean effluent;
    (l) flowing the clean effluent from the second tank through an effluent discharge outlet; and
    (m) flowing effluent overflow from at least one of the sections of the first tank to a particulate moving means trough of a particulate moving means.

* * * * *